United States Patent
Catrein (10) Patent No.: US 9,641,910 B2
(45) Date of Patent: May 2, 2017

(54) COMPRESSION AND DECOMPRESSION TECHNIQUES FOR DRM LICENSE INFORMATION DELIVERY

(75) Inventor: Daniel Catrein, Würselen (DE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 1038 days.

(21) Appl. No.: 13/273,499

(22) Filed: Oct. 14, 2011

(65) Prior Publication Data

US 2012/0102215 A1    Apr. 26, 2012

Related U.S. Application Data

(60) Provisional application No. 61/393,288, filed on Oct. 14, 2010.

(51) Int. Cl.
*H04L 9/08* (2006.01)
*H04L 29/06* (2006.01)
(Continued)

(52) U.S. Cl.
CPC ......... *H04N 21/8355* (2013.01); *G06F 21/10* (2013.01); *H04L 9/0891* (2013.01);
(Continued)

(58) Field of Classification Search
CPC ............. H04L 2463/101; H04L 9/0891; H04L 2209/30; H04L 63/10; H04L 2209/603;
(Continued)

(56) References Cited

U.S. PATENT DOCUMENTS 7,581,255 B2 * 8/2009 Alkove .................. G06F 21/10
                                                    380/201
7,978,848 B2 * 7/2011 Zhu et al. ....................... 380/44
(Continued)

FOREIGN PATENT DOCUMENTS

EP    2003585 A2    12/2008
EP    2150050 A1    2/2010

OTHER PUBLICATIONS

Anonymous. "Open IPTV Forum Specifications, Release 1 Specification, vol. 7—Authentication, Content Protection and Service Protection." V1.1, Oct. 8, 2009, pp. 1-88.

*Primary Examiner* — Gregory Todd
(74) *Attorney, Agent, or Firm* — Coats and Bennett, PLLC (57) ABSTRACT

Techniques for compressing and decompressing license information for Digital Rights Management are described. A method implementation of a technique of creating for a plurality of client devices or client device groups compressed license information comprises the steps of creating a template and a table. The table comprises at least one first license part common to licenses for the plurality of client devices or client device groups and one or more placeholders for one or more second license parts specific for a dedicated client device or client device group. The table comprises, for each client device or client device group and for a given placeholder, replacement information specific for that client device or client device group. The method further comprises sending the template and table for delivery as compressed license information to the client devices or client device groups.

46 Claims, 6 Drawing Sheets (51) Int. Cl.
*H04N 21/4627* (2011.01)
*H04N 21/8355* (2011.01)
*G06F 21/10* (2013.01)

(52) U.S. Cl.
CPC ......... *H04L 63/10* (2013.01); *H04N 21/4627* (2013.01); *H04L 2209/30* (2013.01); *H04L 2209/603* (2013.01); *H04L 2463/101* (2013.01)

(58) Field of Classification Search
CPC . H04N 21/8355; H04N 21/4627; G06F 21/10
USPC .................................. 709/231, 205, 206, 207
See application file for complete search history.

(56) References Cited

U.S. PATENT DOCUMENTS

| | | | |
|---|---|---|---|
| 8,769,300 B2* | 7/2014 | Catrein et al. ................ | 713/189 |
| 2003/0182142 A1 | 9/2003 | Valenzuela et al. | |
| 2005/0197963 A1* | 9/2005 | Raley ...................... | G06F 21/10 705/54 |
| 2005/0198510 A1* | 9/2005 | Robert .................... | G06F 21/10 713/175 |
| 2006/0235800 A1* | 10/2006 | Furlong ................ | G06F 21/105 705/59 |
| 2007/0094145 A1* | 4/2007 | Ta .......................... | G06F 21/105 705/59 |
| 2007/0208668 A1* | 9/2007 | Candelore .......... | G06Q 20/3829 705/57 |
| 2007/0288386 A1* | 12/2007 | Adachi .................... | G06F 21/10 705/58 |
| 2008/0065548 A1* | 3/2008 | Muijen .......................... | 705/51 |
| 2009/0285401 A1* | 11/2009 | Moroney et al. ............. | 380/278 |
| 2009/0304115 A1 | 12/2009 | Pittaway et al. | |
| 2009/0327702 A1* | 12/2009 | Schnell .................... | G06F 21/10 713/155 |
| 2010/0299522 A1* | 11/2010 | Khambete ............ | H04L 63/061 713/168 |
| 2011/0072495 A1* | 3/2011 | Chu et al. ......................... | 726/4 |
| 2011/0103374 A1* | 5/2011 | Lajoie et al. ................. | 370/352 |
| 2011/0231870 A1* | 9/2011 | Hartung et al. ................ | 725/25 |
| 2012/0102215 A1* | 4/2012 | Catrein ......................... | 709/231 |

* cited by examiner

COMPRESSION AND DECOMPRESSION TECHNIQUES FOR DRM LICENSE INFORMATION DELIVERY

RELATED APPLICATIONS

This application claims priority to U.S. Provisional Application Ser. No. 61/393,288 filed Oct. 14, 2010.

TECHNICAL FIELD

The present disclosure generally relates to the field of Digital Rights Management (DRM). In particular, techniques for processing license information delivered in a DRM context are presented.

BACKGROUND

Media content, such as audio, video and multimedia content, can be delivered via unicast, multicast or broadcast communication links from a media content source (also called media content server) to media content recipients (also called client devices). The delivery of media content today widely relies on streaming mechanisms and file transfer technologies.

To prevent an unauthorized duplication of the media content on a client side it becomes increasingly important to implement efficient DRM technologies. DRM relies on cryptographic processes to permit media content consumption (e.g., storing or playing out) only to client devices that possess proper cryptographic material.

In the following, the processes underlying DRM will be described with exemplary reference to the DRM technology platform developed by the Marlin Developer Community (MDC).

To enable secure and governed media content consumption, a license concept has been proposed by the MDC. A Marlin license is an Extended Mark-Up Language (XML) document of several kilobyte that contains a set of license objects that govern the use of the media content and convey the conditions necessary for allowing access to the cryptographic key ("content key") used to encrypt the media content. The license objects comprise, for example, a key object including encrypted key data and a binding object binding the media content to the key object.

A typical DRM process starts with an MDC client device selecting, for example in a Web Store, media content (such as a song or video) for download. The Web Store informs a client application running on the client device where and how to obtain the media content and returns a so-called Action Token to the client device. An Action Token contains a set of processing instructions the client device must perform in order to obtain the license that is required for consuming the selected media content. The Web Store also communicates with its "Back Office" to provide it with the information needed for the DRM process.

The client application passes the Action Token received from the Web Store to a Marlin Client DRM Engine in the client device. The Marlin Client DRM Engine performs the actions specified in the Action Token such as the transmission of appropriate service requests to a remote Marlin Server DRM Module under control of Marlin protocols. The Marlin Server DRM Module constructs related requests and sends those to the Back Office. The Back Office applies processing logic to the requests received from the Marlin Server DRM Module and returns information to the Marlin Server DRM Module that enables same to build the license for the selected media content. The license is then sent by the Marlin Server DRM Module to the Marlin Client DRM Engine, which provides it to the client application.

The client application downloads the media content independently from receipt of the license. At the time a user wishes to consume the downloaded media content, the client application consults the Marlin Client DRM Engine to verify the license. If the license can be positively verified, the media content will be decrypted and can thus be consumed.

The above DRM scenario describes the situation in which a single license is delivered to a single client device for a single content item. In many cases a large number of client devices (or client device groups) may wish to obtain access to a particular content item, such as a live sports event (e.g., via broadcast transmission). In such cases a large number of licenses have to be transmitted. If the license information would be embedded in a content stream (in-band transmission) the effective transmission bandwidth that remains available for the media content would be reduced. In case of an out-of-band transmission it is generally desirable to reduce the resources required for the transmission of license information. In some scenarios the license channel bandwidth might need to be splitted among possibly thousands of client devices.

SUMMARY

There is a need for a technique that enables a reduction of the resources required for the transmission of license information for a plurality of client devices or client device groups.

According to a first aspect, a method of creating for a plurality of client devices or client device groups compressed license information for DRM is provided, wherein the method comprises creating a template comprising at least one first license part common to licenses for the plurality of client device or client device groups and one or more placeholders for one or more second license parts specific for a dedicated client device or client device group, creating a first table comprising, for each client device or client device group and for a given placeholder, replacement information specific for that client device or client device group, and sending at least the template and the first table for delivery as compressed license information to the client devices or client device groups.

Creating the first table may comprise decoding a BASE64 encoded string (see IETF RFC 2045 RFC) to binary data as replacement information (e.g., in the form of replacement strings). In certain implementations, a further compression of the license information may thus be realized. The decoding may be performed prior to sending.

Moreover, a first encoding parameter may be provided as encoding information that defines a required encoding of the replacement information when replacing the one or more place holders in the template with the replacement information. The first table may also include the first encoding parameter. The first encoding parameter may define that the replacement information is to be at least one of BASE64 encoded, used in a plain format and used in an integer format.

The template, or data included therein (e.g., the first licence part and/or the second license part), may be processed by an encoding (e.g., a compression and/or encryption) operation. In this regard, a second encoding parameter may be provided that defines the encoding of the template and/or of the data included therein. The template may further include the second encoding parameter. The encoding may be performed prior to sending.

In one implementation, one or more further tables may be provided that define an association, mapping or link between the first table and the template. For example, a second table may be created that associates a reference index with each placeholder. In such a case, the first table may associate, for each client device or client device group and for a given placeholder, replacement information specific for that client device or client device group with the reference index of that placeholder. The second table may be comprised by the compressed license information.

The license information may include one or several data items such as Marlin license objects, or any similar or other license objects. In one implementation, the license information comprises one or more cryptographic content keys for DRM purposes. In such a scenario, the one or more second license parts may contain the one or more cryptographic content keys. The replacement information may also contain the one or more cryptographic content keys. The one or more cryptographic content keys in the license information may be encrypted for a specific client device or client device group.

In addition or as an alternative to the one or more cryptographic content keys, the first table may contain a device identifier. The device identifier may identify the device to which the license will be bound.

At least the template and the first table (and, if used, the optional second table) may be associated with at least one association identifier that allows associating at least the template and the first template (and, if used, the optional second table) with each other. The association identifier may be a license identifier. In other words, the license identifier may be used for association purposes. Of course, other (e.g., proprietary) identifiers could alternatively be used for this purpose.

The template may have a template field configured to indicate that the template contains a complete license (i.e., does not contain any placeholders to be replaced). In addition, or alternatively, a predefined value of the association identifier (e.g., of the license identifier) may be configured to indicate that the license is complete and does not contain any placeholders to be replaced.

The at least one first license part may include information regarding a common overall structure and/or regarding common control information. The common control information may, for example, comprise a control program (e.g., in the form of executable bytecode that may run on a virtual machine). The control program may be in charge of checking conditions for media content access. Additionally, or as an alternative, the control program may check whether certain DRM nodes are reachable. The at least one first license part may further (or alternatively) include metadata that provide human-readable information to describe the conditions required by the license.

The method may comprise embedding at least the template and the first table into the content stream. If used, the second table may likewise be embedded into the content stream. In one implementation, the content stream with the embedded template and the embedded first template (and the optionally embedded second table) may be sent to the client devices or client device groups. The content stream may conform to the Moving Picture Experts Group (MPEG) 2-Transport Stream (TS) specification or any other TS specification. In a Marlin implementation, at least the template and the first table may be embedded in one or more Entitlement Management Messages (EMMs) conforming to the Marlin Broadband specification. If used, the optional second table may likewise be embedded into one or more EMMs.

The license information may conform to any DRM specification. As an example, the license information may conform to the Marlin Broadband specification. The license as such may be provided in any format, such as an XML or HTML format. The license may have a size in the order kilobyte.

According to a further aspect, a method of decompressing compressed license information for a given client device or client device group for DRM is provided, wherein the method comprises receiving compressed license information, the license information comprising a template comprising at least one licence part common to licenses for a plurality of client devices or client device groups and one or more placeholders for one or more second license parts specific for a dedicated client device or client device group, and a first table comprising, for each client device or client device group and for a given placeholder, replacement information specific for that client device or client device group, and reconstructing a license by replacing the one or more placeholders in the template with the replacement information from the first table for the given client device or client device group.

The replacement information may be processed prior to reconstructing the license. The first table may further comprise a first encoding parameter that defines the processing of the replacement information in this regard. As an example, the first encoding parameter may define a required encoding of the replacement information when replacing the one or more placeholders in the template with the replacement information. The encoding of the replacement information may include applying BASE64 encoding to the replacement information. In certain implementations, binary data may thus be retrieved that replaces one or more placeholders in the template. The encoding parameter may indicate that BASE64 encoding is to be applied. Alternatively, the first encoding parameter may define that the plain replacement information is to be used or an integer representation thereof for replacing one or more placeholders in the template.

The method may also comprise decoding (e.g., decompressing and/or decrypting) the template, or data included therein. The decoding may be performed prior to reconstructing the license. A second encoding parameter may be provided that defines the decoding of the template or of the data included therein. The template or the data included therein may be decoded in accordance with the second encoding parameter.

The method may also comprise receiving one or more further tables. As an example, a second table may be received that associates a reference index with each placeholder. Additionally, or as an alternative, the first table may associate, for each client device or client device group and for a given placeholder, the replacement information specific for that client device or client device group with the reference index of that placeholder. Reconstructing the license may in such a situation comprise replacing the one or more placeholders in the template with the replacement information from the first table for the given client device or client device group according to one or more reference indices from the second table.

The client device may have no Internet Protocol (IP) connectivity. At least the template in the first table (and, if used, the optional second table) may be received via broadcast. Moreover, at least the template in the first table (and, if used, the optional second table) may be received embedded in a content stream.

The content stream may conform to the MPEG 2-TS specification. Moreover, at least the template and the first table may be embedded in one or more EMMs that conform to the Marlin Broadband specification.

As stated above, the license information may comprise one or more items of information including, for example, one or more cryptographic content keys for DRM. The one or more second license parts may in such a case contain one or more cryptographic content keys. The replacement information may likewise contain the one or more cryptographic content keys. The one or more content keys may be device-specific, so that the reconstructed license may include at least one device-specific cryptographic content key. The device-specific nature of the cryptographic content key may be inherent to the cryptographic content key as such (e.g., different cryptographic content keys are provided for different devices) or may result from encrypting a common content key in a device-specific manner (using, e.g., a device specific encryption key). The one or more cryptographic content keys may thus be encrypted for a specific client device or client device group.

In one implementation, the first table may contain a device identifier. Moreover, an association identifier may be associated with at least the template and the first table so as to allow associating at least the template and the first table with each other. The association identifier may be a license identifier. Moreover, a predefined value of the association identifier may be configured to indicate that the license is complete (i.e., does not contain any placeholders to be replaced). Any other than the predefined value may be interpreted to indicate that there is a matching second table and at least one corresponding first table with the same association identifier (e.g., license identifier) in a stream of EMMs.

Receiving the license information may comprise receiving the first table and determining that the first table contains a device identifier that is associated with the receiving client device. In a next step, an association identifier (e.g., a license identifier) comprised by the first table may be determined. In a next step a search for at least the first table (and, if used, the optional second table) with matching association identifier may be performed.

The license information may conform to any DRM standard, such as the Marlin Broadband specification.

According to a still further aspect, a computer program product is provided. The computer program product comprises program code portions for performing the steps of any of the methods described herein when the computer program product is run or executed on one or more computing devices. The computer program product may be stored on a computer-readable recording medium such as a permanent or re-writeable memory, a CD-ROM, or a DVD. The computer program product may also be provided for download via a communication network such as the Internet, a cellular communication network or a wireless or Wired Local Area Network (WLAN).

According to a further aspect, an apparatus for creating for a plurality of client devices or client device groups compressed license information for DRM is provided, wherein the apparatus comprises a compressor configured to create a template comprising at least one first license part common to licenses for the plurality of client devices or client device groups and one or more placeholders for one or more second license parts specific for a dedicated client device or client device group, and a first table comprising, for each client device or client device group and for a given placeholder, replacement information specific for that client device or client device group, and an interface configured to send at least the template and the first table for delivery as compressed license information to the client devices or client device groups.

The apparatus may further comprise a multiplexer configured to embed at least the template and the table into a content stream. In case one or more intermediate data structures (e.g., one or more further tables) linking or associating the template and the table are provided, those intermediate data structures may likewise be embedded into the content stream.

The apparatus may be configured to carry out any of the method steps for creating compressed license information discussed herein.

According to a still further aspect, an apparatus for decompressing compressed license information for DRM for a given client device or client device group is provided, wherein the apparatus comprises an interface configured to receive compressed license information, the compressed license information comprising a template comprising at least one first license part common to licenses for a plurality of client devices or client device groups and one or more placeholders for one or more second license parts specific for a dedicated client device or client device group, and a first table comprising, for each client device or client device group and for a given placeholder, replacement information specific for that client device or client device group, and a decompressor configured to reconstruct a license by replacing the one or more placeholders in the template with the replacement information from the first table for the given client device or client device group.

The apparatus may further comprise a demultiplexer configured to separate at least the template and the table that are received embedded in a content stream from the content stream. In the case an intermediate data structure (e.g., another table) linking, or associating, the template and the table is provided and received in the content stream, that intermediate data structure may likewise be separated from the content stream.

The apparatus may be configured to carry out the steps of an of the methods for decompressing license information presented herein.

According to another aspect, a data structure defining for a plurality of client devices or client device groups compressed license information for DRM is provided, wherein the data structure comprises a template comprising at least one first license part common to licenses for the plurality of the client devices or client device groups and one or more placeholders for one or more second license parts specific for a dedicated client device or client device group, and a first table comprising, for each client device or client device group and for a given placeholder, replacement information specific for that client device or client device group.

The data structure may further comprise an intermediate data structure linking, or associating, the template and the first table. The intermediate data structure may comprise a second table associating a reference index with each placeholder. In such a case the first table may associate, for each client device or client device group and for a given placeholder, replacement information specific for that client device or client device group with the reference index of that placeholder.

At least the template and a first table (and, if used, the optional second table) may be separate data elements. The separate data elements may be associated with each other via an association identifier that allows associating the data elements to each other. In one implementation, the association identifier may be a license identifier.

The data structure presented herein may be embodied in a data signal. Alternatively, the data structure may take the form of one or more database records.

BRIEF DESCRIPTION OF THE DRAWINGS

In the following, further technical details, aspects and advantages of the techniques presented herein will be discussed in connection with exemplary embodiments illustrates in the drawings, wherein.

DETAILED DESCRIPTION

In the following, for purposes of explanation and not limitation, specific details are set forth, such as specific apparatus and system configurations and specific processing operations, to provide a thorough understanding of the techniques presented herein. It will be apparent to one skilled in the art that the techniques presented herein may be practised in other embodiments that depart from these specific details. For example, while the following embodiments will primarily be described in the context of the Marlin DRM technology platform, it will be appreciated that the techniques presented herein may also be implemented in connection with other DRM technology platforms. It will be appreciated that any technique presented herein may be implemented in the form of a system, an apparatus or a method.

Those skilled in the art will further appreciate that the methods, steps and functions explained herein may be implemented using individual hardware circuitry, using software functioning in conjunction with a programmed microprocessor or general purpose computer, using one or more Application Specific Integrated Circuits (ASICs), one or more Digital Signal Processors (DSPs) and/or one or more Field Programmable Gate Arrays (FPGAs). It will be appreciated that the methods, steps and functions disclosed herein may also be embodied in a processor and memory coupled to the processor, wherein the memory stores one or more programs that perform the steps discussed herein when executed by the processor.

Figure 1:
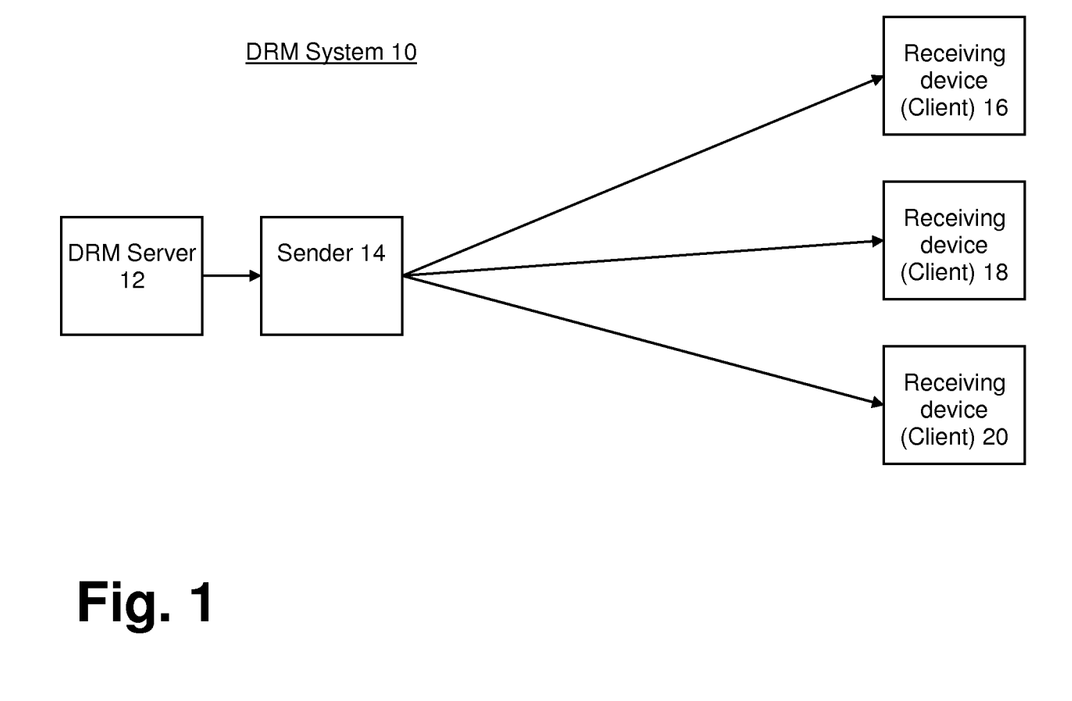
FIG. 1 shows an embodiment of a portion of a DRM system in which the techniques presented herein may be implemented.

FIG. 1 illustrates several components of an exemplary DRM system 10 in which the techniques presented herein may be implemented. As shown in FIG. 1, the DRM system 10 comprises a DRM server 12, a sender 14 as well as multiple client devices (or client device groups) 16, 18, 20. While the DRM server 12 and sender 14 are illustrated in FIG. 1 as separate devices, both components may alternatively be implemented as a single device (e.g., a single network node). The sender 14, which will not be considered in more detail hereinafter, may comprise an input unit (such as an input interface), a processor and a transmitter. The sender 14 may be configured to transmit media content to the client devices 16, 18, 20 via unicast, multicast or broadcast transmissions (or any combination thereof).

Figure 2:
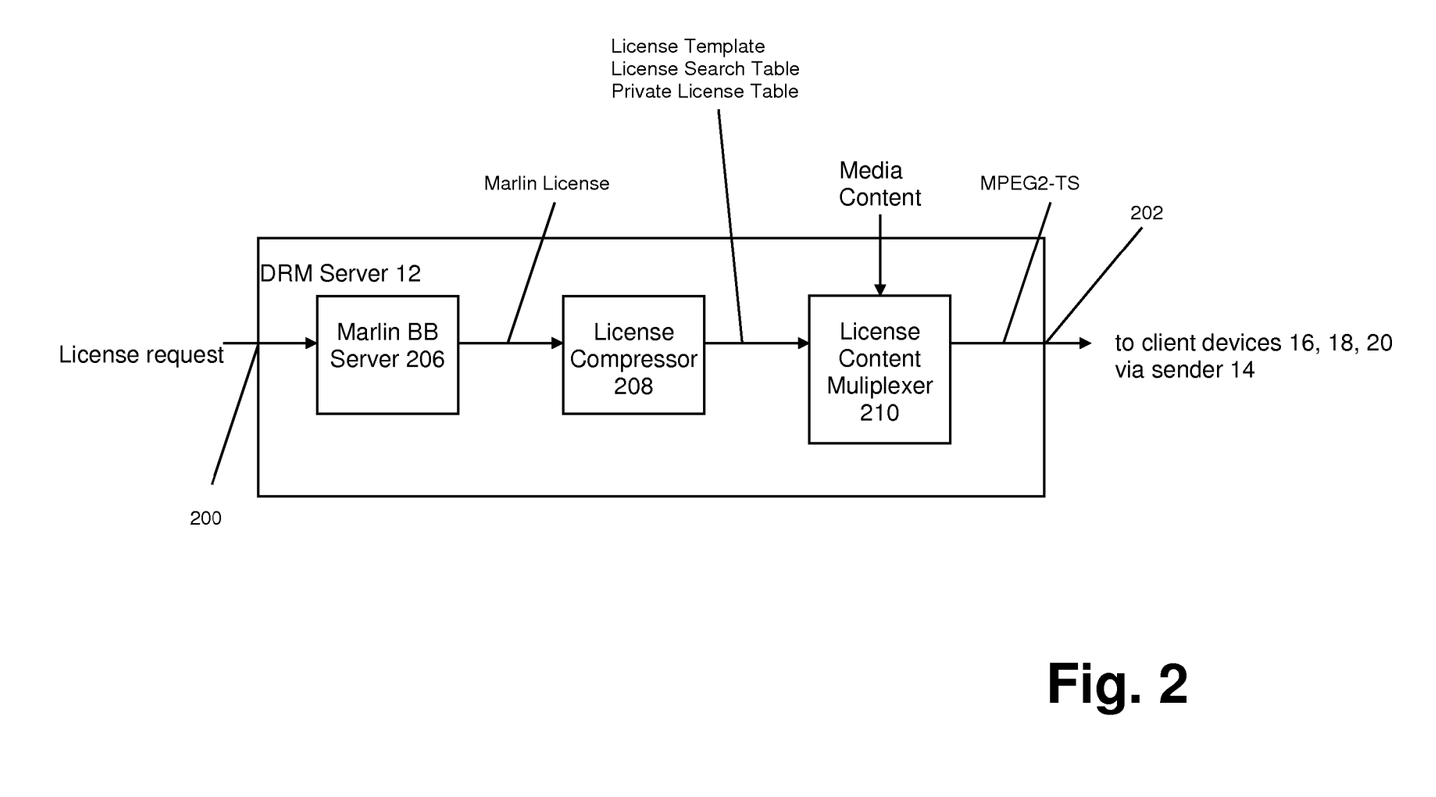
FIG. 2 shows an embodiment of an apparatus for creating compressed license information.

FIG. 2 illustrates the internal components of the DRM server 12 of FIG. 1. The DRM server 12 of FIG. 2 is an embodiment of an apparatus for creating for a plurality of client devices 16, 18, 20 compressed license information. The compressed license information conforms to the Marlin DRM technology platform.

As shown in FIG. 2, the DRM server 12 comprises in input interface 200 for receiving a license request and an output interface 202 to the client devices 16, 18, 20 (via the sender 14) in FIG. 1. The DRM server 12 further comprises a Marlin Broadband (BB) server 206, a license compressor 208 and a license content multiplexer 210. The Marlin BB server 206 may be configured as a Marlin Server DRM Module and may receive the license request from Marlin Client DRM Engines (not shown in FIG. 2) located in the client devices 16, 18, 20. The Marlin BB server 206 is configured to create a Marlin licence (e.g., a corresponding XML document) of typically several kilobyte based on supplemental information received from a Back Office (not shown in FIG. 2).

The license compressor 208 is configured to receive the Marlin license from the Marlin BB server 206 and to compress the license information included therein as will be discussed in more detail below. The output of the license compressor 208 includes compressed license information in the form of a (license) template, a first (private license) table as well as an optional second (license search) table. The compressed license information output by the license compressor 208 is input to the license content multiplexer 210. The license content multiplexer 210 receives media content (e.g., from a media content server not illustrated in FIG. 2) and multiplexes the compressed license information output by the license compressor 208 with the media content into a content stream such an MPEG 2-TS. In other words, the license content multiplexer 210 is configured to embed the template, the first table and the optional second table into a content stream. The resulting content stream with the embedded license information will be output via the output interface 202 for a transmission, via the sender 14, to the client devices 16, 18, 20 as shown in FIG. 1.

Figure 3:
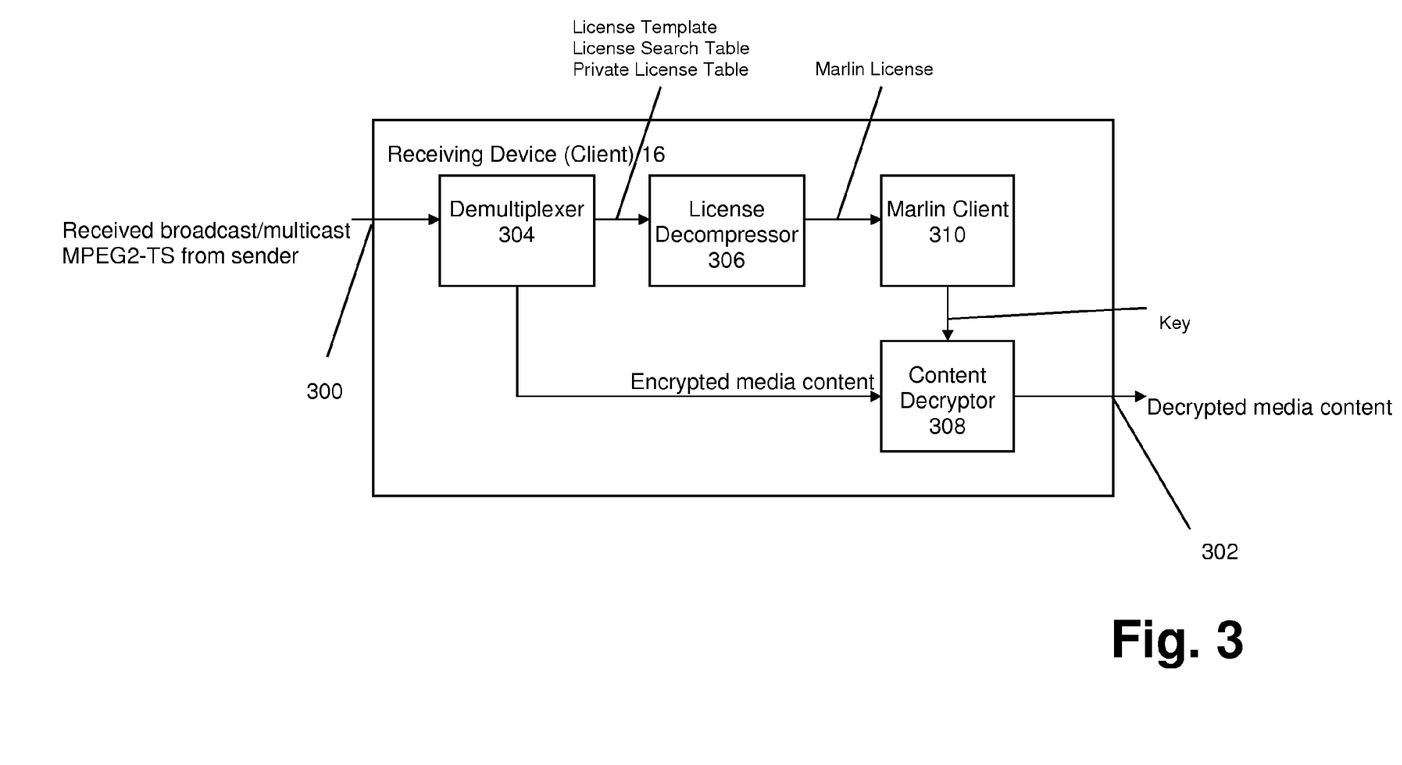
FIG. 3 shows an embodiment of an apparatus for decompressing license information.

FIG. 3 illustrates the internal components of one of the client devices 16 as an illustration of an embodiment for an apparatus for decompressing compressed license information.

As shown in FIG. 3, the client device 16 comprises an input interface 300 for receiving the content stream with the embedded license information (that was created by the DRM server 12) from the sender 14. Additionally, the client device 16 comprises an output interface 302 for outputting decrypted media content. A de-multiplexer 304 is configured to separate the license information (i.e., the template, the first table and the optional second table) that are received embedded in the content stream from the content stream (i.e., from the media content). The de-multiplexer 304 is further configured to separately forward the compressed license information to a license de-compressor 306 and the (encrypted) media content to a content decryptor 308.

The license de-compressor 306 reconstructs the Marlin license based on the compressed license information (i.e., the template, the first table and the optional second table) received from the demultiplexer 304 and outputs the Marlin license to the Marlin client 310. The Marlin client 310 receives the Marlin license from the license de-compressor 306 and outputs a key, a so-called content key, to the content decryptor 308. The content decryptor 308 is configured to decrypt the encrypted media content using the content key.

The Marlin client 310 may be realized in the form of a Marlin Client DRM Engine. To prevent unauthorized access to the media content (and to the content key), the Marlin client 310 needs to verify whether or not the client device 16 is in possession of a valid Marlin license. As shown in FIG. 3, the Marlin license is obtained by the Marlin client from the license de-compressor 306, which reconstructs the Marlin license based on the compressed license information received from the de-multiplexer 304.

In the following, the operation of the license compressor 208 of the DRM server 12 as well as of the license de-compressor 306 of the client device 16 will be described in more detail with reference to the exemplary flow diagrams 400 and 500 of FIGS. 4 and 5, respectively.

Figure 4:
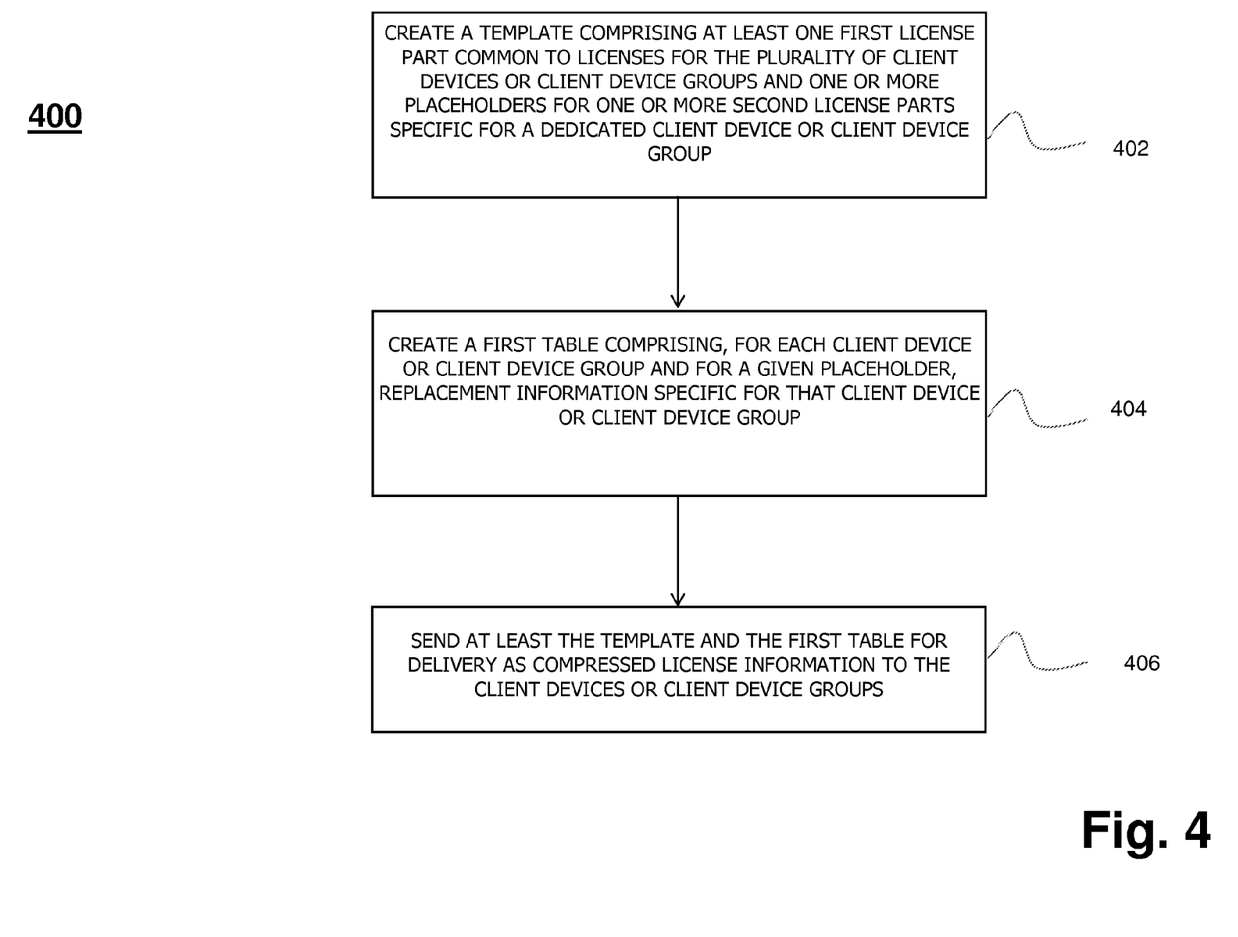
FIG. 4 shows a flow diagram illustrating an embodiment of a method for creating compressed license information.

The flow diagram 400 of FIG. 4 illustrates an embodiment of a method for creating for a plurality of client devices 16, 18, 20 (or, alternatively, client device groups) compressed license information for DRM by the DRM server 12. In a first step 402, for example upon receipt of one or multiple Marlin licenses by the license compressor 208, the license compressor 208 creates a template comprising at least one first license part common to licenses for the plurality of client devices 16, 18, 20 (or client device groups) and one or more placeholders for one or more second license parts specific for a dedicated client device or client device group. The one or more first license parts may, for example, include metadata that provide human-readable information to describe the conditions required by the license and/or a control program (e.g., a piece of executable bytecode that runs on a virtual machine) which checks conditions for content access and whether certain DRM nodes such as the Back Office are reachable. The one or more second license parts may include encrypted key data (such as a content key encrypted with a device-specific encryption key).

In a next step 404, a first table is created by the compressor 208. The first table comprises, for each client device (or client device group) and for a given placeholder, replacement information specific for that client device (or client device group). If, for example, the template includes a placeholder which stands for encrypted key data, the replacement information may include or constitute the encrypted key data.

In an optional further step not illustrated in FIG. 4, a second table associating a reference index with each placeholder may be created by the license compressor 208. In such a case the first table may associate, for each client device (or client device group) and for a given placeholder, replacement information specific for that client device (or client device group) with the reference index of that placeholder.

In a further step 406, the template and the first table (and, if used, the optional second table) are sent via the output interface 202 for delivery to the client devises 16, 18, 20) or client device groups).

Figure 5:
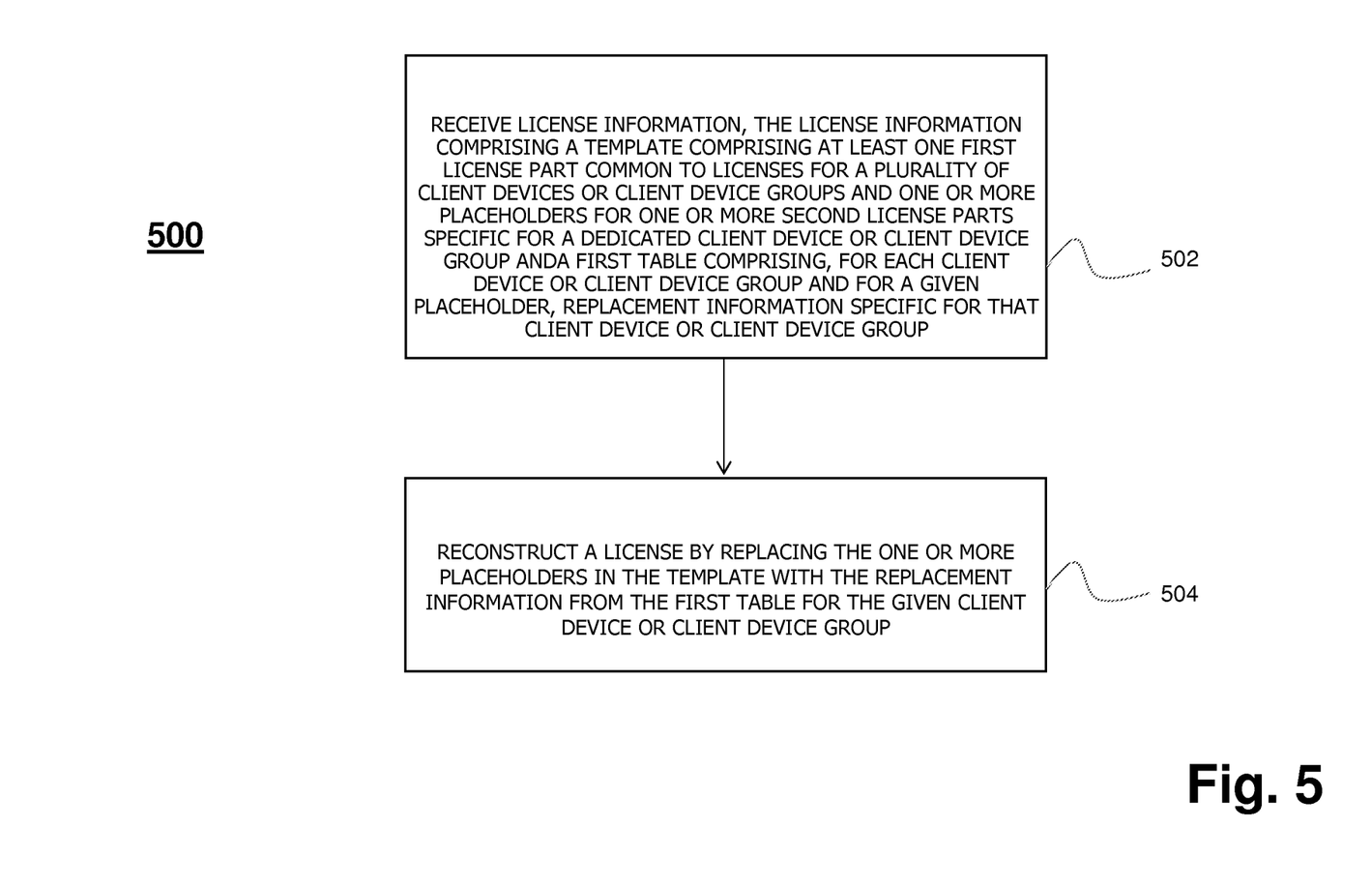
FIG. 5 shows a flow diagram illustrating an embodiment of a method for decompressing compressed license information.

The flow diagram 500 of FIG. 5 illustrates an embodiment of a method for decompressing compressed license information for a given client device or client device group for DRM as performed by the client device 16 of FIG. 3.

In an initial step 502, license information is received via the input interface 300. The license information comprises a template comprising at least one first license part common to licenses for a plurality of client devices (or client device groups) and one or more placeholders for one or more second license parts specific for a dedicated client device (or client device group). The license information further comprises a first table comprising, for each client device (or client device group) and for a given placeholder, replacement information specific for that client device (or client device group). Optionally, also the second table discussed above may be received.

In a further step 504, the license de-compressor 306 reconstructs a license by replacing the one or more placeholders in the template with the replacement information from the first table for the given client device 16 (or client device group).

Optionally, if the second table is used also, the license de-compressor 306 may reconstruct the license by replacing the one or more placeholders in the template with the replacement information from the first table for the given client device or client device group according to one or more reference indices from the second table. As state above, the second table associates a reference index with each placeholder and the first table associates, for each client device or client device group and for a given placeholder, the replacement information specific for that client device or client device group with the reference index of that placeholder.

Figure 6:
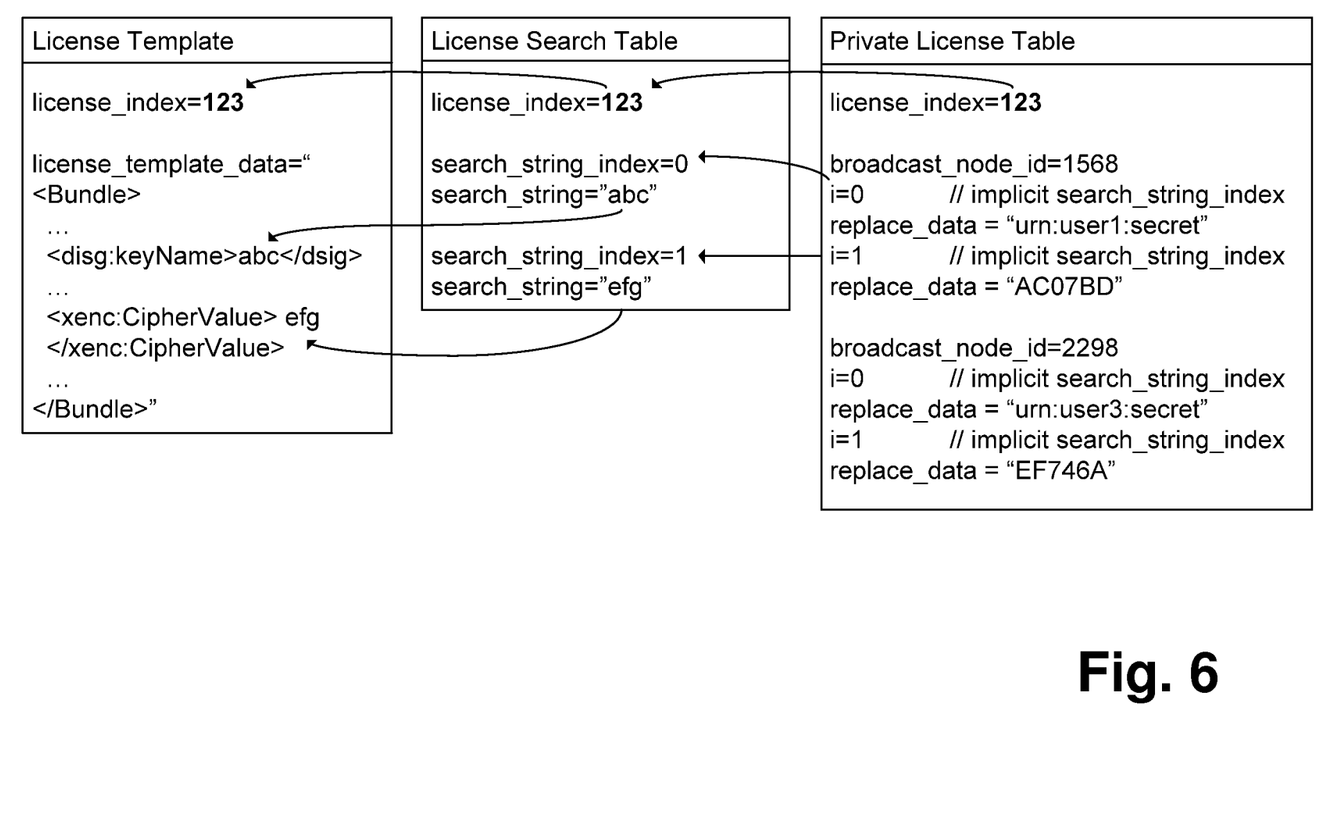
FIG. 6 shows an embodiment of a data structure for defining compressed license information.

FIG. 6 illustrates an embodiment of a data structure (realized, for example, in the form of a data signal or one or more database records) that defines, for a plurality of client devices or client device groups, compressed license information for DRM. The data structure of FIG. 6 illustrates exemplary templates and tables as processed by the DRM server 12 and the client device 16 in connection with compressing and decompressing license information.

As shown in FIG. 6, the (license) template, the first (private license) table and the second (license search) table are linked by a license_index that is common to all three data elements. This means that the three data elements with the same license_index value (in this example "123") are interpreted together in connection with decompressing an individual Marlin license.

The template comprises two placeholders (or search strings), namely "abc" and "efg". The second (license search) table associates those search strings "abc" and "efg" to indices 0 and 1, respectively. The client-specific replacement information included in the first (private license) table refers to those indices. As an example, for the device with device ID 1568 (in FIG. 6, the "broadcast node ID" constitutes the device ID), the indices 0 and 1 are associated to the strings "urn:user1:secret" and "AC07BD", respectively. Thus, for this device, a license will be constructed by replacing "abc" by "urn:user1:secret" and by replacing "efg" by "AC07BD".

It should be noted that use of the second (license search) table is particularly advantageous in case the template is defined in a XML format due to certain peculiarities of the XML format that make a direct referencing between the template and the first (private license) table difficult. If the template (e.g., in non-Marlin embodiments) is defined in a format different from XML, use of the second (license search) table may not be necessary.

In the following, the compression and decompression techniques presented herein will be described in more detail with reference to further Marlin embodiments. It should be noted that the various Marlin embodiments described herein may be combined as needed.

The following embodiment will specifically be described as an extension to the Marlin Broadband Transport Streams specification (BBTS) that allows for Marlin license delivery inside BBTS MPEG-2 Transport Streams (MPEG2-TS). In the context of the following embodiment a compression technique is presented supporting efficient delivery of similar licenses (or client device groups). Although the embodiments described herein are primarily described in the context of the Marlin standard, it is evident to the skilled person that the general concepts of modular license distribution as described herein can be applied to alternative DRM standards as well.

DRM licenses are available (e.g., generated) at the sending (e.g., broadcasting) side (DRM server 12, see FIG. 1). The licenses (at least two) have at least a first part that is common to all licenses and a second part that is specific for a dedicated receiver/client device (or group of receivers/client devices 16, 18, 20).

At the sending side, the second part is separated from the first part (e.g., filtered out), and the second part is replaced by placeholders (e.g., search strings), to create a license template comprising the first part and the placeholders. The template is optionally compressed (e.g., using bzip2). Alternatively or in addition, one could start with the first part and insert placeholders to create the template, or one could have a generic template with already inserted placeholders and generate the second part correspondingly.

A first table (e.g., a private license table) is created in order to map replacement strings which constitute a representation of the second part (e.g., the second part or some kind of encoded version of the second part, such as a binary representation of a BASE64 encoded string together with encoding information) to reference indices. A further compression may be achieved by predefining one or more fields for specific information (e.g., the device ID may have a predefined index, such as device ID=index0).

A second table that is optional may be created (e.g., a search table), and in the second table each placeholder (e.g., a search string) is associated with a reference index (e.g., a search string index). Alternatively to the aforementioned table embodiment, some kind of standardized or predefined notation may be used to map reference indices to search strings.

At least the template and the first table are associated with an association identifier that allows the receiver/client device 16, 18, 20 to associate both the template and the corresponding table (e.g., the association identifier may be a license ID being part of the template and the second table). A similar mechanism may be employed for the case that the optional second table is also used. The association identifier for associating the second table to the template may be identical or different from the association identifier for associating the template with the first table.

The template and the first table (and, if the second table is used, also the second table) is embedded into the content stream (e.g., in EMMs), and sent (e.g., broadcasted or multicasted) to the receiving devices.

At the receiving side, the receiver (i.e., the client device) extracts the template, the private license (and, if the second table is used, also the second table) from the received content stream. It may be of advantage if the receiver searches the stream for the first table (i.e., for the presence of the device ID that is associated to the receiving device) and to extract that corresponding first table. The first table comprises the aforementioned association identifier with the template (and, optionally, the one with the second table, if the second table is used), and then extracts the template as identified by the association identifier (and, if used, also the second table with the help of the association identifier associating the second table with the template).

The search order may, for example be:
device ID→first table→template→second table.

In case both association identifiers are identical, the search order may be as described before or:
device ID→first table→second table→template.

The receiver may search the first table for the presence of search strings and insert the search strings at the place of the placeholder in the template. If encoding information is used as described above, then the insertion is performed according to the encoding information (see replace data encoding in Table 6 below and the discussion before).

If the optional second table is used, the replacement occurs via the information in the first table:

First table search string index <–> replacement string
Second table search string <–> search string index
Template Search string If the second table is not used, then First Table search string <–> replacement string
Template search string Instead of table, the more general term mapping or mapping algorithm or mapping function may be used herein with respect to the related content.

In the following, the embodiment more generally described above will be presented in greater detail in the context of exemplary template and table formats.

1.1 Organization

This following description of a more detailed embodiment is organized as follows:

Section 1 provides abbreviations, definitions and references.

Section 2 provides background on the usage of the technologies defined here and introduces a compact representation of Marlin BB licenses.

Section 0 defines extensions to the BBTS specification to embed compact Marlin BB licenses into MPEG2 transport streams.

This following description makes as much as possible use of existing Marlin specifications. This description specifies a minimal set of technologies and the 'glue' in between them that make the above goal possible. In case of gaps present in the set of existing open specifications referred to hereinafter, the following description specifies solutions to fill those gaps.

1.2 References 1.2.1 Normative References

[BBTS] Marlin Broadband Transport Stream Specification, Version 1.0.2, Final, 7 Apr. 2010

[MPEG2-TS] Information technology—Generic coding of moving pictures and associated audio information: Systems, ISO/IEC 13818-1:2000(E), Second edition, 2000-12-01

[MRL-BB] Marlin Developer Community Marlin Broadband Specification, Version 1.2

[RFC2119] IETF RFC2119, Key words for use in RFCs to Indicate Requirement Levels, March 1997

[TTS] ARIB STD-B24 Version 5.1, Data Coding and Transmission Specification for Digital Broadcasting, Association of Radio Industries and Businesses, 14 Mar. 2007.

1.2.2 Informative References

[Marlin] Marlin
http://www.marlin-community.com/

1.3 Definitions for the Following Description

Inband license Delivery of Marlin BB licenses together with the content. In the
delivery context of this description always inside License A template of a Marlin BB license that can be converted to a Template valid Marlin BB license by replacing search strings with device specific replacement strings containing, e.g., device IDs and content keys encrypted for the device.

License Search A table matching search string with search string indices.
Table

Private License A table matching search string indices with device specific
Table replacement strings.

1.4 Acronyms

BBTS Broadband Transport Stream
MPEG-2 TS MPEG-2 Transport Stream
TTS MPEG-2 Timed Transport Stream 2 Scenario This section describes the relation between the technology presented herein and its environment and introduces the concept of compact representation of Marlin licenses.

2.1 Usage Scenario (Informative)

The solution defined in this herein supports delivery of Marlin BB licenses over Marlin Broadband Transport Streams. It enables Marlin license delivery to client devices that have no IP connectivity to a Marlin server by embedding Marlin BB licenses into MPEG2-TS as described in Section 2.2. This is particularly interesting in hybrid delivery use-cases where a service provider wishes to exploit the benefits of Marlin for devices connected via an IP broadband connection and for those that are only connected via broadcast, e.g., via satellite or terrestrial broadcast In these scenarios, the number of supported business models is typically limited, i.e., most client devices obtain licenses implementing the same business model for the same content. This specification defines a compact representation of Marlin BB licenses for use-cases where a large number of clients obtain very similar licenses. Details on this can be found in Section 2.3.

2.2 Stream Format

BBTS defines a protected content format for Marlin using an MPEG-2 Transport Stream or an MPEG-2 Timed Transport Stream (TTS). The stream includes Entitlement Control Messages (ECMs) and may include Entitlement Management Messages (EMMs). In BBTS, EMMs are only used to convey Universal Resource Locators (URLs). The following description defines a new type of EMMs to convey license information, see Section 3.

2.3 Compact License Representation

In this section, a compression scheme for Marlin BB licenses is defined that can be used to transmit efficiently the same, typically personality node bound, license to a large number of devices. This scheme is based on a common license template which is the same for all devices. A receiving device replaces search strings in the license template with private license information to retrieve, or reconstruct, a valid Marlin license.

The following elements are used for the compression scheme:
License Template
License Search Table
Private License Table 2.3.1 License Template The License Template contains all parts of a Marlin BB license bundle that is common to all devices. Typically, this is the overall structure, the control, etc. Parts that are different are replaced by placeholders that are calling in the search strings (for details see Section 3.2).

It is to be noted that also complete Marlin licenses transferred as License Template are supported.

2.3.2 License Search Table

The License Search Table defines the search strings that occur in the License Template and associates an index to each search string. Client specific replacement information will refer to these indices. It should be noted that the License Search Table may contain multiple search strings with the same index (for details see Section 3.3).

2.3.3 Private License Table

The Private License Table associates for each device (i.e., device ID) replacement strings to search string indices (for details see Section 3.4).

2.4 Client Side License decompression

Whenever a client receives a Private License Table containing its device ID, it tries to find a License Search Table and a License Template Table with matching license_index.

Once a client possesses a Private License Table containing its device ID and corresponding License Search and License Template Tables with matching license_index, it reconstructs a Marlin license by replacing all search strings in the License Template with the replace data from the Private License Table for this device according to the indices defined in License Search Table.

3 Entitlement Management

Transport streams using the license delivery mechanism defined in this document include in the CAT the BBTS CA_descriptor as defined in BBTS and also include the EMMs as defined in Section 3.1.

DRM clients support presence of the BBTS CA_descriptor in the CAT and support EMMs specified in Section 3.1.

3.1 License EMM Section Format

The License EMM section defines a container that can be used to convey a Marlin BB License efficiently inside an MPEG2-TS stream.

TABLE 1

Rights URLs section syntax

| Syntax | No. of bits |
|---|---|
| License_EMM_section( ) { | |
|   Table_id = 0x83 | 8 uimsbf |
|   section_syntax_indicator | 1 uimsbf |
|   DVB_reserved | 1 uimsbf |
|   ISO_reserved | 2 uimsbf |
|   section_length | 12 uimsbf |
|   format_selector | 8 uimsbf |
|   For (i=0; i<N; i++){ | |
|     license_part_byte | 8 bslbf |
|   } | |
| } | | table_id, this specification has defined the value of 0x83 for the License EMM section.
section_syntax_indicator, set to 0.
DVB_reserved, bit reserved for future use by DVB.
ISO_reserved, bits reserved by ISO/IEC 13818-1.
section_length, the number of bytes that follow the section_length field up to the end of the section.
license_part_byte, this field contains at least one or several optional parameters encoded in TLV format as defined in the following sections. The different optional fields are distinguished via the type_tag. To ensure evolution of the specification, parameters with unknown type_tag are ignored.

This specification defines three types of license parts:
License Template
License Search Table
Private License Table All parts contain a license_index field. Clients match different parts that belong together via identical values of the license_index field.

3.2 License Template Part (the "Template" in the Above General Embodiments)

This section defines the format of a License Template part of a License.

TABLE 2

License Template Part syntax

| Syntax | No. of bits |
|---|---|
| License_Template ( ) { | |
|   type_tag = 0x00 | 8 uimsbf |
|   license_index | 16 uimsbf |
|   Encoding | 2 uimsbf |
|   section_number | 8 uimsbf |
|   final_section | 1 uimsbf |
|   Reserved | 1 uimsbf |
|   data_size | 12 uimsbf |
|   For (i=0; i<data_size; i++){ | |
|     license_template_data_byte | 8 bslbf |
|   } | |
| } | | type_tag, this value is equal to 0x00 for a License Template.
license_index, specifies the index of this license template. The index is used to match corresponding Search Tables and Private License Tables. A license index value of 0xFFFF indicates that this is a complete Marlin license that does not contain any search strings that need to be replaced. For any other value of license_index, there is a matching License Search Table part and at least one corresponding Private License Table part with the same license_index in the EMM stream.
encoding, defines the encoding of data in the license_template_data_byte field according to Table 3.

TABLE 3

Encoding values

| Value | Identification | Meaning |
|---|---|---|
| 00 | ASCII | The data in the license_template_data_byte is interpreted as plain single byte ASCII. |
| 01 | Compressed | The data in the license_template_data_byte is interpreted as bzip2 compressed data. |
| 10 | reserved | This value is reserved for future use. A client ignores this value. |
| 11 | reserved | This value is reserved for future use. A client ignores this value. | final_section, this bit is set to zero if there are sections with a higher section_number belonging to this License Template and it is set to 0 if this is the last section of this License Template.
section_number, This 8-bit field gives the number of this section. The section_number of the first section of a License Template shall be 0x00. It is incremented by 1 with each additional section of the License Template.
data_size, number of bytes of license template data stored in this part.
license_template_data_byte, license template that is encoded according to encoding given by the encoding field. In case the encoded License Template exceeds the maximum size available for the EMM, the encoded license Template is split into blocks of a certain number of byte (e.g., as defined in a pre-defined variable) that are embedded as private data with increasing section_number starting from 0.

3.3 License Search Table Part (the Optional "Second Table" in the Above General Embodiments)

This section defines the format of a License Search Table part of a License.

TABLE 4

License Search Table syntax

| Syntax | No. of bits |
|---|---|
| License_Template ( ) { | |
|   type_tag = 0x01 | 8 uimsbf |
|   license_index | 16 uimsbf |
|   search_string_count | 8 uimsbf |
|   For (i=0; i<search_string_count; i++) | |
|     search_string_index | 8 uimsbf |
|     search_string_length | 8 uimsbf |
|     For (i-0; i<search_string_length; i++) | |
|       search_string_data_byte | 8 uimsbf |
|     } | |
|   } | |
| } | | type_tag, this value is equal to 0x01 for a License Search Table.
license_index, specifies the index of this license template. The index is used to match corresponding License Template and Private License Tables.
search_string_count, number of search strings stored in this part.
search_string_index, defines the index of this search string. There may be multiple entries with the same index. It should be noted that in this case, all these strings will be replaced with the same replacement string.
search_string_length, the length of the search string.
search_string_data_byte, the ASCII representation of the search string.

3.4 Private License Table Part (the "First Table" in the Above General Embodiments)

This section defines the format of a Private License Table part of a License.

TABLE 5

Private License Table syntax

| Syntax | No. of bits |
|---|---|
| License_Template ( ) { | |
|   type_tag = 0x02 | 8 uimsbf |
|   license_index | 16 uimsbf |
|   license_count | 8 uimsbf |

TABLE 5-continued

Private License Table syntax

| Syntax | No. of bits |
|---|---|
| For (i=0; i<license_count; i++) | |
|    device_id | 32 uimsbf |
|    replace_string_count | 8 uimsbf |
|    For (i=0; i<replace_string_count; i++) | |
|      search_string_index | 8 uimsbf |
|      replace_data_encoding | 2 uimsbf |
|      reserved | 6 uimsbf |
|      replace_data_length | 8 uimsbf |
|      For (i-0; i<replace_data_length; i++) | |
|        replace_data_data_byte | 8 uimsbf |
|      } | |
|    } | |
| } | |
| } | | type_tag, this value is equal to 0x02 for a Private License Table.
license_index, specifies the index of this license template. The index is used to match corresponding License Template and License Search Tables.
license_count, number of licenses transmitted in this Private License Table.
device_id, 32 bit id of the device to which the License will be bound.
replace_string_count, number of replacement string transmitted for this license.
search_string_index, defines the index of this search string which will be replaced in the License Template by the replacement data. The value 0x00 will not be used.
replace_data_encoding, defines the encoding that is used for the replacement string when replacing the search string in the License Template with the replacement data. The replacement string is obtained when applying the encoding on the replacement data. Possible values are stated in Table 6.

TABLE 6

Replacement data encoding values

| Value | Identification | Meaning |
|---|---|---|
| 00 | plain | The search string shall be replaced with the bytes that can be found in the replacement data |
| 01 | base64 | The search string shall be replaced with the base64 encoded representation of the replacement data. |
| 10 | integer | The search string shall be replaced with an integer representation of the numerical value of the replacement data. |
| 11 | reserved | This value is reserved for future use. A client shall ignore this value. | replace_data_length, the length in bytes of the replace string.
replace_data_data_byte, the replace data.

The device_id may always be implicitly be associated with the search_string_index 0 and interpreted according to the integer data encoding rule stated in Table 6.

While the techniques presented herein have been described with respect to particular embodiments, those skilled in the art will recognize that the present invention is not limited to the specific embodiments described and illustrated herein. Accordingly, it is to be understood that this disclosure is only illustrative and that is intended that the invention be limited only by the scope of the claims appended hereto.

The invention claimed is:

1. A method of creating, for a plurality of client devices or client device groups, compressed license information for Digital Rights Management, the method comprising:
creating a template comprising:
at least one first license part common to licenses for the plurality of client devices or client device groups; and
one or more placeholders for one or more second license parts specific for a dedicated client device or client device group, wherein a dedicated license specific to the dedicated client device or client device group comprises both the at least one first license part and the one or more second license parts; and
creating a common first table comprising replacement information specific:
for each respective client device or client device group in the plurality of client devices or client device groups; and
for replacing a given placeholder of the one or more placeholders in the template with a given second license part of the one or more second license parts to reconstruct the dedicated license; and
sending at least the template and the common first table for delivery as compressed license information to the client devices or client device groups.

2. The method of claim 1, wherein creating the common first table comprises decoding a BASE64 encoded string to binary data as replacement information.

3. The method of claim 1, further comprising providing a first encoding parameter that defines a required encoding of the replacement information when replacing the one or more placeholders in the template with the replacement information, wherein the common first table also includes the first encoding parameter.

4. The method of claim 3, wherein the first encoding parameter defines whether the replacement information is to be BASE 64 encoded or used in a plain format or in an integer format.

5. The method of claim 1, further comprising encoding the template, or data included therein.

6. The method of claim 5, further comprising providing a second encoding parameter that defines the encoding of the template, or of the data included therein, wherein the template also includes the second encoding parameter.

7. The method of claim 1, further comprising:
creating a second table associating a reference index with each placeholder;
wherein the common first table associates, for each client device or client device group and for a given placeholder, replacement information specific for that each respective client device or client device group with the reference index of that a given placeholder.

8. The method of claim 1, wherein the license information comprises one or more cryptographic content keys for Digital Rights Management, and wherein the replacement information contains the one or more cryptographic content keys.

9. The method of claim 8, wherein each of the one or more cryptographic content keys is encrypted for a specific client device or client device group.

10. The method of claim 1, wherein the common first table contains a device identifier.

11. The method of claim 1, further comprising associating at least the template and the common first table with at least one association identifier that allows associating at least the template and the common first table with each other.

12. The method of claim 11, wherein the association identifier is a license identifier.

13. The method of claim 1, wherein a predefined value of the association identifier is configured to indicate that the license is complete and does not contain any placeholders to be replaced.

14. The method of claim 1, wherein the at least one first license part includes at least one of information regarding a common overall structure and common control information.

15. The method of claim 1, further comprising embedding at least the template and the common first table into a content stream.

16. The method of claim 15, further comprising sending the content stream with the embedded template and the embedded common first table to the client devices or client device groups.

17. The method of claim 15, wherein the content stream conforms to the MPEG2-TS specification.

18. The method of claim 1, wherein at least the template and the common first table are embedded in one or more Entitlement Management Messages that conform to the Marlin Broadband specification.

19. The method of claim 1, wherein the license information conforms to the Marlin Broadband specification.

20. A method of decompressing compressed license information for a given client device or client device group for Digital Rights Management, the method comprising:
  receiving compressed license information, the license information comprising:
    a template comprising:
      at least one first license part common to licenses for a plurality of client devices or client device groups; and
      one or more placeholders for one or more second license parts specific for a dedicated client device or client device group, wherein a dedicated license specific to the dedicated client device or client device group comprises both the at least one first license part and the one or more second license parts; and
    a common first table comprising replacement information specific:
      for each respective client device or client device group in the plurality of client devices or client device groups; and
      for replacing a given placeholder of the one or more placeholders in the template with a given second license part of the one or more second license parts to reconstruct the dedicated license; and
  reconstructing the dedicated license by replacing the one or more placeholders in the template with the replacement information from the common first table for the given client device or client device group.

21. The method of claim 20, further comprising processing the replacement information prior to reconstructing the dedicated license.

22. The method of claim 20, wherein the common first table further comprises a first encoding parameter that defines a required encoding of the replacement information when replacing the one or more placeholders in the template with the replacement information.

23. The method of claim 22, wherein the first encoding parameter defines whether the replacement information is to be BASE64 encoded or used in a plain format or in integer format.

24. The method of claim 20, further comprising decoding the template, or data included therein.

25. The method of claim 24, wherein the template further comprises a second encoding parameter that defines the encoding of the template, or of the data included therein, and further comprising decoding the template or the data included therein in accordance with the second encoding parameter.

26. The method of claim 20, further comprising:
  receiving a second table associating a reference index with each placeholder;
  wherein the common first table associates, for each client device or client device group and for a given placeholder, the replacement information specific for that client device or client device group with the reference index of that placeholder; and
  wherein reconstructing the dedicated license comprises replacing the one or more placeholders in the template with the replacement information from the common first table for the given client device or client device group according to one or more reference indices from the second table.

27. The method of claim 20, wherein the client device has no IP connectivity.

28. The method of claim 20, wherein at least the template and the common first table are received via broadcast.

29. The method of claim 20, wherein at least the template and the common first table are received embedded in a content stream.

30. The method of claim 29, wherein the content stream conforms to the MPEG2-TS specification.

31. The method of claim 20, wherein at least the template and the common first table are embedded in one or more Entitlement Management Messages that conform to the Marlin Broadband specification.

32. The method of claim 20:
  wherein the license information comprises one or more cryptographic content keys for Digital Rights Management;
  wherein the replacement information contains the one or more cryptographic content keys.

33. The method of claim 32, wherein each of the one or more cryptographic content keys are encrypted for a specific client device or client device group.

34. The method of claim 20, wherein the common first table contains a device identifier.

35. The method of claim 20, further comprising associating at least the template and the common first table with at least one association identifier that allows associating at least the template and the common first table with each other.

36. The method of claim 35, wherein the association identifier is a license identifier.

37. The method of claim 20, wherein a predefined value of the association identifier is configured to indicate that the license is complete and does not contain any placeholders to be replaced.

38. The method of claim 37, wherein any value for the association identifier other than the predefined value indicates that there is a matching second table and at least one corresponding common first table with the same license identifier in a stream of Entitlement Management Messages.

39. The method of claim 20, wherein receiving the license information comprises:
  receiving the common first table and determining that the common first table contains a device identifier that is associated with the client device;
  determining an association identifier comprised by the common first table; and searching for at least the template with matching association identifier.

40. The method of claim 20, wherein the license information conforms to the Marlin Broadband specification.

41. A computer program product stored in a non-transitory computer readable recording medium for controlling a programmable computing device, the computer program product comprising software instructions that, when run on the programmable computing device, cause the programmable computing device to:
  create a template comprising:
    at least one first license part common to licenses for the plurality of client devices or client device groups; and
    one or more placeholders for one or more second license parts specific for a dedicated client device or client device group, wherein a dedicated license specific to the dedicated client device or client device group comprises both the at least one first license part and the one or more second license parts; and
  create a common first table comprising replacement information specific:
    for each respective client device or client device group in the plurality of client devices or client device groups; and
    for replacing a given placeholder of the one or more placeholders in the template with a given second license part of the one or more second license parts to reconstruct the dedicated license; and
  send at least the template and the common first table for delivery as compressed license information to the client devices or client device groups.

42. A computer program product stored in a non-transitory computer readable recording medium for controlling a programmable computing device, the computer program product comprising software instructions that, when run on the programmable computing device, cause the programmable computing device to:
  receive compressed license information, the license information comprising:
    a template comprising:
      at least one first license part common to licenses for a plurality of client devices or client device groups; and
      one or more placeholders for one or more second license parts specific for a dedicated client device or client device group, wherein a dedicated license specific to the dedicated client device or client device group comprises both the at least one first license part and the one or more second license parts; and
    a common first table comprising replacement information specific:
      for each respective client device or client device group in the plurality of client devices or client device groups; and
      for replacing a given placeholder of the one or more placeholders in the template with a given second license part of the one or more second license parts to reconstruct the dedicated license; and
  reconstruct the dedicated license by replacing the one or more placeholders in the template with the replacement information from the common first table for the given client device or client device group.

43. An apparatus for creating, for a plurality of client devices or client device groups, compressed license information for Digital Rights Management, the apparatus comprising:
  processing circuitry configured to create:
    a template comprising:
      at least one first license part common to licenses for the plurality of client devices or client device groups; and
      one or more placeholders for one or more second license parts specific for a dedicated client device or client device group, wherein a dedicated license specific to the dedicated client device or client device group comprises both the at least one first license part and the one or more second license parts; and
    a common first table comprising replacement information specific:
      for each respective client device or client device group in the plurality of client devices or client device groups; and
      for replacing a given placeholder of the one or more placeholders in the template with a given second license part of the one or more second license parts to reconstruct the license; and
  interface circuitry configured to send at least the template and the common first table for delivery as compressed license information to the client devices or client device groups.

44. The apparatus of claim 43, further comprising multiplexer circuitry configured to embed at least the template and the table into a content stream.

45. An apparatus for decompressing compressed license information for a given client device or client device group for Digital Rights Management, the apparatus comprising:
  interface circuitry configured to receive compressed license information, the compressed license information comprising:
    a template comprising:
      at least one first license part common to licenses for a plurality of client devices or client device groups; and
      one or more placeholders for one or more second license parts specific for a dedicated client device or client device group, wherein a dedicated license specific to the dedicated client device or client device group comprises both the at least one first license part and the one or more second license parts; and
    a common first table comprising replacement information specific:
      for each respective client device or client device group in the plurality of client devices or client device groups; and
      for replacing a given placeholder of the one or more placeholders in the template with a given second license part of the one or more second license parts to reconstruct the dedicated license;
  processing circuitry configured to reconstruct the dedicated license by replacing the one or more placeholders in the template with the replacement information from the common first table for the given client device or client device group.

46. The apparatus of claim 45, further comprising demultiplexer circuitry configured to separate at least the template and the table that are received embedded in a content stream from the content stream.

* * * * *